US010866806B2

United States Patent
Tirumala et al.

(10) Patent No.: US 10,866,806 B2
(45) Date of Patent: Dec. 15, 2020

(54) UNIFORM REGISTER FILE FOR IMPROVED RESOURCE UTILIZATION

(71) Applicant: NVIDIA CORPORATION, Santa Clara, CA (US)

(72) Inventors: Ajay Tirumala, Cupertino, CA (US); Jack Choquette, Palo Alto, CA (US); Manan Patel, San Jose, CA (US); Shirish Gadre, Fremont, CA (US); Praveen Kaushik, Bengaluru (IN)

(73) Assignee: NVIDIA Corporation, Santa Clara, CA (US)

( * ) Notice: Subject to any disclaimer, the term of this patent is extended or adjusted under 35 U.S.C. 154(b) by 214 days.

(21) Appl. No.: 15/897,092

(22) Filed: Feb. 14, 2018

(65) Prior Publication Data
US 2019/0146796 A1    May 16, 2019

Related U.S. Application Data

(60) Provisional application No. 62/586,031, filed on Nov. 14, 2017.

(51) Int. Cl.
| | |
|---|---|
| *G06F 9/44* | (2018.01) |
| *G06F 9/45* | (2006.01) |
| *G06F 9/30* | (2018.01) |
| *G06F 8/41* | (2018.01) |
| *G06F 9/48* | (2006.01) |
| *G06F 9/38* | (2018.01) |
| *G06F 9/455* | (2018.01) |

(52) U.S. Cl.
CPC .......... *G06F 9/30141* (2013.01); *G06F 8/427* (2013.01); *G06F 8/434* (2013.01); *G06F 8/443* (2013.01); *G06F 9/3836* (2013.01); *G06F 9/45516* (2013.01); *G06F 9/4881* (2013.01)

(58) Field of Classification Search
CPC .... G06F 9/30141; G06F 8/427; G06F 9/4881; G06F 9/45516; G06F 9/3836; G06F 8/434
See application file for complete search history.

(56) References Cited

U.S. PATENT DOCUMENTS

| | | | |
|---|---|---|---|
| 8,677,105 B2 * | 3/2014 | Abdallah | G06F 9/30043 712/228 |
| 2009/0217248 A1 * | 8/2009 | Bently | G06F 8/30 717/132 |

(Continued)

OTHER PUBLICATIONS

Shao-Chung Wang, Energy Efficient Affine Register File for GPU Microarchitecture, 2016, pp. 52-58. https://ieeexplore.ieee.org/stamp/stamp.jsp?tp=&arnumber=7576452 (Year: 2016).*

(Continued)

*Primary Examiner* — Mongbao Nguyen
(74) *Attorney, Agent, or Firm* — Artegis Law Group, LLP

(57) ABSTRACT

A compiler parses a multithreaded application into cohesive blocks of instructions. Cohesive blocks include instructions that do not diverge or converge. Each cohesive block is associated with one or more uniform registers. When a set of threads executes the instructions in a given cohesive block, each thread in the set may access the uniform register independently of the other threads in the set. Accordingly, the uniform register may store a single copy of data on behalf of all threads in the set of threads, thereby conserving resources.

20 Claims, 10 Drawing Sheets

(56) References Cited

U.S. PATENT DOCUMENTS

| | | | | |
|---|---|---|---|---|
| 2010/0161948 | A1* | 6/2010 | Abdallah | G06F 9/30043 712/228 |
| 2012/0246657 | A1* | 9/2012 | Abdallah | G06F 9/5038 718/102 |
| 2013/0117541 | A1* | 5/2013 | Choquette | G06F 9/3842 712/214 |
| 2013/0145124 | A1* | 6/2013 | Qiu | G06F 15/167 712/208 |
| 2013/0232322 | A1* | 9/2013 | Fetterman | G06F 9/3887 712/225 |
| 2013/0326524 | A1* | 12/2013 | Houston | G06F 9/522 718/102 |
| 2014/0365752 | A1* | 12/2014 | Howes | G06F 9/3851 712/233 |
| 2015/0026438 | A1* | 1/2015 | Giroux | G06F 9/38 712/225 |
| 2015/0058832 | A1* | 2/2015 | Gonion | G06F 8/433 717/150 |
| 2015/0095914 | A1* | 4/2015 | Mei | G06F 9/4843 718/102 |
| 2015/0205586 | A1* | 7/2015 | Diamos | G06F 8/41 717/158 |
| 2016/0019066 | A1* | 1/2016 | Diamos | G06F 9/30087 712/228 |
| 2016/0371067 | A1* | 12/2016 | Absar | G06F 8/456 |
| 2017/0097825 | A1* | 4/2017 | Lo | G06F 8/443 |
| 2018/0095885 | A1* | 4/2018 | Jackson | G06F 9/30138 |
| 2018/0129504 | A1* | 5/2018 | Howes | G06F 9/3009 |
| 2018/0275991 | A1* | 9/2018 | Khorasani | G06F 15/8007 |
| 2019/0087188 | A1* | 3/2019 | Vaidyanathan | G06F 9/30123 |

OTHER PUBLICATIONS

Yun Liang, An Accurate GPU Performance Model for Effective Control Flow Divergence Optimization, 2016, pp. 1165-1177. https://ieeexplore.ieee.org/stamp/stamp.jsp?tp=&arnumber=7329967 (Year: 2016).*

Yunsup Lee, Convergence and Scalarization for Data-Parallel Architectures, 2013, pp. 1-11. https://ieeexplore.ieee.org/stamp/stamp.jsp?tp=&arnumber=6494995 (Year: 2013).*

Jingweijia Tan, Mitigating the Susceptibility of GPGPUs Register File to Process Variations, 2015, pp. 969-978. https://ieeexplore.ieee.org/stamp/stamp.jsp?tp=&arnumber=7161582 (Year: 2015).*

Shuo Wang, Performance-centric Register File Design for GPUs using Racetrack Memory, 2016, pp. 25-30. https://ieeexplore.ieee.org/stamp/stamp.jsp?tp=&arnumber=7427984 (Year: 2016).*

Sparsh Mittal, A Survey of Techniques for Architecting and Managing GPU Register File, 2016, pp. 1-13. https://www.osti.gov/pages/servlets/purl/1332070 (Year: 2016).*

Ralf Karrenberg, Automatic SIMD Vectorization of SSA-based control flow graphs, 2014, pp. 1-203. https://core.ac.uk/download/pdf/77125704.pdf (Year: 2014).*

Yunsup Lee, Decoupled Vector-Fetch Architecture with a Scalarizing Compiler, 2016, pp. 1-159. https://people.eecs.berkeley.edu/~krste/papers/EECS-2016-117.pdf (Year: 2016).*

Lee, Yunsup, "Decoupled Vector-Fetch Architecture with a Scalarizing Compiler", Electrical Engineering and Computer Sciences, University of California at Berkeley, http://www.eecs.berkeley.edu/Pubs/TechRpts/2016/EECS-2016-117.html, May 24, 2016, pp. 1-159.

Lee et al., "Convergence and Scalarization for Data-Parallel Architectures", CGO '13: Proceedings of the 2013 IEEE/ACM International Symposium on Code Generation and Optimization (CGO), Feb. 23-27, 2013, 11 pages.

GPU Ocelot, "A Dynamic Compilation Framework for GPU Computing", http://gpuocelot.gatech.edu/, Sep. 8, 2014, 2 pages.

"Direct3D 12 graphics—Win32 apps", Microsoft Docs, https://docs.microsoft.com/en-in/windows/win32/direct3d12/direct3d-12-graphics?redirectedfrom=MSDN, Nov. 27, 2018, 1 page.

* cited by examiner

UNIFORM REGISTER FILE FOR IMPROVED RESOURCE UTILIZATION

CROSS-REFERENCE TO RELATED APPLICATIONS

This application claims priority benefit of the U.S. Provisional Patent Application titled, "Uniform Datapath for Improved Resource Utilization," filed on Nov. 14, 2017 and having Ser. No. 62/586,031. The subject matter of this related application is hereby incorporated herein by reference.

BACKGROUND OF THE INVENTION

Field of the Invention

Embodiments of the present invention relate generally to multithreaded processing and, more specifically, to a uniform register file for improved resource utilization.

Description of the Related Art

A conventional parallel processor typically executes multiple sets of threads in parallel to perform various operations. The conventional parallel processor includes a vector processor for performing vector-oriented operations. The vector processor typically includes a register file that stores data on a per-thread basis. The register file includes a separate storage slot for each thread in a given set of threads. For a particular thread in the given set of threads, the corresponding storage slot in the register file stores values that are used by the thread during execution. When the given set of threads executes, each thread in the given set of threads accesses the corresponding storage slot and reads from and/or writes to that storage slot.

During execution, each thread in a set of threads may perform operations on different data. Accordingly, in some cases, each storage slot in the register file stores different data. However, in certain situations, the threads in a set of threads may perform operations on at least some of the same data. Accordingly, in these cases, some or all of the storage slots in the register file store identical copies of data. For example, when a set of threads is configured to perform a matrix multiplication operation, each storage slot in the register file could store a different copy of the base address of a matrix data structure where the result of the matrix multiplication operation is to be written. During execution of the matrix multiplication operation, a given thread would access the corresponding data slot in the register file to read the copy of the base address stored therein. The thread would then perform a portion of the matrix multiplication operation and write the result of that operation to the matrix data structure using the base address and an offset associated with the thread. Accordingly, for a set of 32 threads, the register file would store 32 copies of the same base address within 32 separate storage slots.

During execution, each thread in a set of threads also may perform different operations depending on various factors, including input parameters, thread indices, and so forth. However, in certain situations, each thread in a set of threads may execute identical operations. For example, when a set of threads is configured to perform the matrix multiplication operation discussed above, each thread may be configured to perform a division operation between two constant values. During execution, each thread would divide the two constant values to generate a result. The result would then be used in performing a portion of the overall matrix multiplication operation. Accordingly, for a set of 32 threads, the same division operation would be performed 32 times.

One drawback of the above approach is that the register file can end up storing redundant copies of data. Again, for 32 threads, the register file may, at times, store 32 identical copies of data used by the 32 threads. Provisioning storage space for redundant data is inherently inefficient and needlessly wastes processor die area. Another drawback of the above approach is that multiple threads can end up performing the same operation to generate the same result. As noted above, in certain situations involving a set of 32 threads, all 32 threads may perform an identical operation and generate an identical result. Performing the same operation multiple times wastes processor cycles and needlessly consumes power.

As the foregoing illustrates, what is needed in the art are more effective techniques for executing threads in parallel processors.

SUMMARY OF THE PRESENT INVENTION

One embodiment of the present invention sets forth a computer-implemented method for executing cohesive blocks of instructions, including parsing an application program to generate a first cohesive block, wherein the first cohesive block comprises a first set of instructions that do not converge and do not diverge, causing a first thread in a first group of threads to access a first uniform register file to read a first value while executing the first cohesive block, and causing a second thread in the first group of threads to access the first uniform register to read the first value while executing the first cohesive block, wherein the second thread accesses the first value at least partially in parallel with the first thread accessing the first value.

One advantage of the approach described herein is that only one copy of input data needs to be stored on behalf of all threads in a group of threads. Accordingly, storage space and processor area can be conserved. The disclosed approach therefore represents a technical advancement over conventional techniques that require separate copies of the input data to be stored for each different thread. Another advantage of the disclosed approach is that multiple threads need not perform identical operations to generate identical results, thereby conserving processor cycles and increasing processor efficiency. Thus, the approach described herein confers a technical advantage by improving the operation of a computing device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

As noted above, a conventional parallel processor implements a register file that stores an identical copy of data for each different thread in a group of threads. Provisioning storage space for these identical copies is inherently inefficient and needlessly wastes processor area. Further, conventional parallel processors oftentimes cause multiple threads in a group of threads to perform the same operation to generate the same result. Performing the same operation multiple times wastes processor cycles and needlessly consumes excess power.

To address these inefficiencies, a datapath core includes a uniform register file (URF) that stores a single copy of data that is shared across all threads in a group of threads. The URF may also store a single copy of the result of an operation that each thread in the thread group is configured to perform.

In operation, a compiler parses an application program to generate one or more "cohesive blocks" to be executed by one or more sets of threads. A cohesive block (CB) includes a subset of instructions that do not converge or diverge. A given CB also specifies a particular uniform register (UR) within the URF that is configured to store data to be used by a set of threads that executes the CB. When each thread in the group of threads performs an operation that depends on a given value, the UR stores a single copy of that value. Each thread is provided with independent access to the single copy of the value. Further, when each thread in the group of threads performs the same operation to generate a single result, the UR stores a single copy of that result. Each thread is provided with independent access to the single copy of the result.

One advantage of this approach is that any additional storage slots ordinarily allocated for redundant data can be freed, thereby utilizing storage space with greater efficiency. Another advantage of this approach is that multiple threads need not perform identical operations to generate identical results, thereby conserving processor cycles and further improving storage efficiency. In addition, because each thread is provided with independent access to the single copy of data stored in the UR, application programmers can write programs according to common programming paradigms that provide granular control over individual threads.

System Overview

Figure 1:
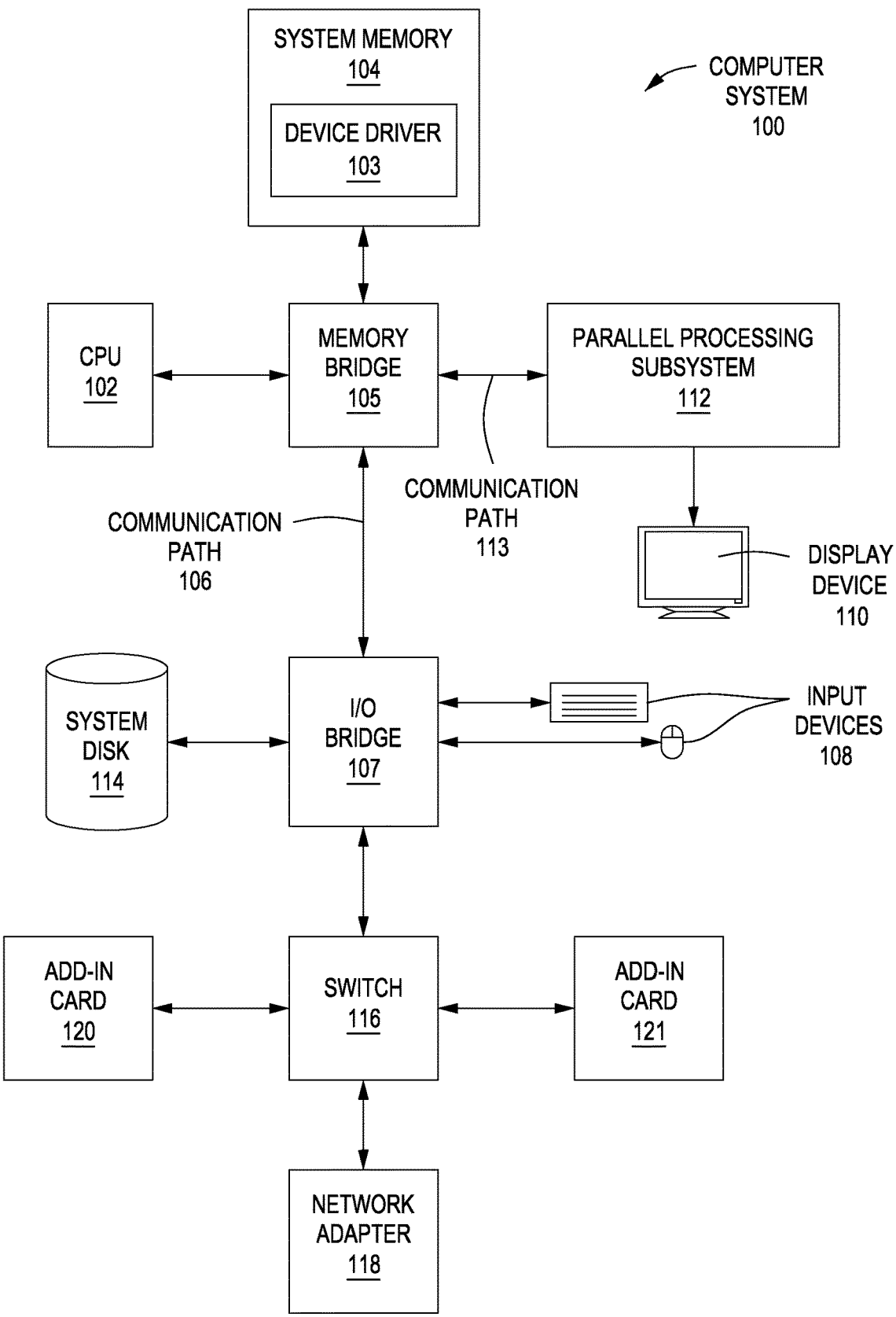
FIG. 1 is a block diagram of a computer system configured to implement one or more aspects of the present invention.

FIG. 1 is a block diagram of a computer system 100 configured to implement one or more aspects of the present invention. Broadly speaking, computer system 100 may be any system that includes a memory, a parallel processing unit or graphics processing unit, and a central processing unit. As shown, however, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. Device driver 103 may include one or more compilers configured to compile application-level instructions into machine-level instructions, as described in greater detail below in conjunction with FIG. 4.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
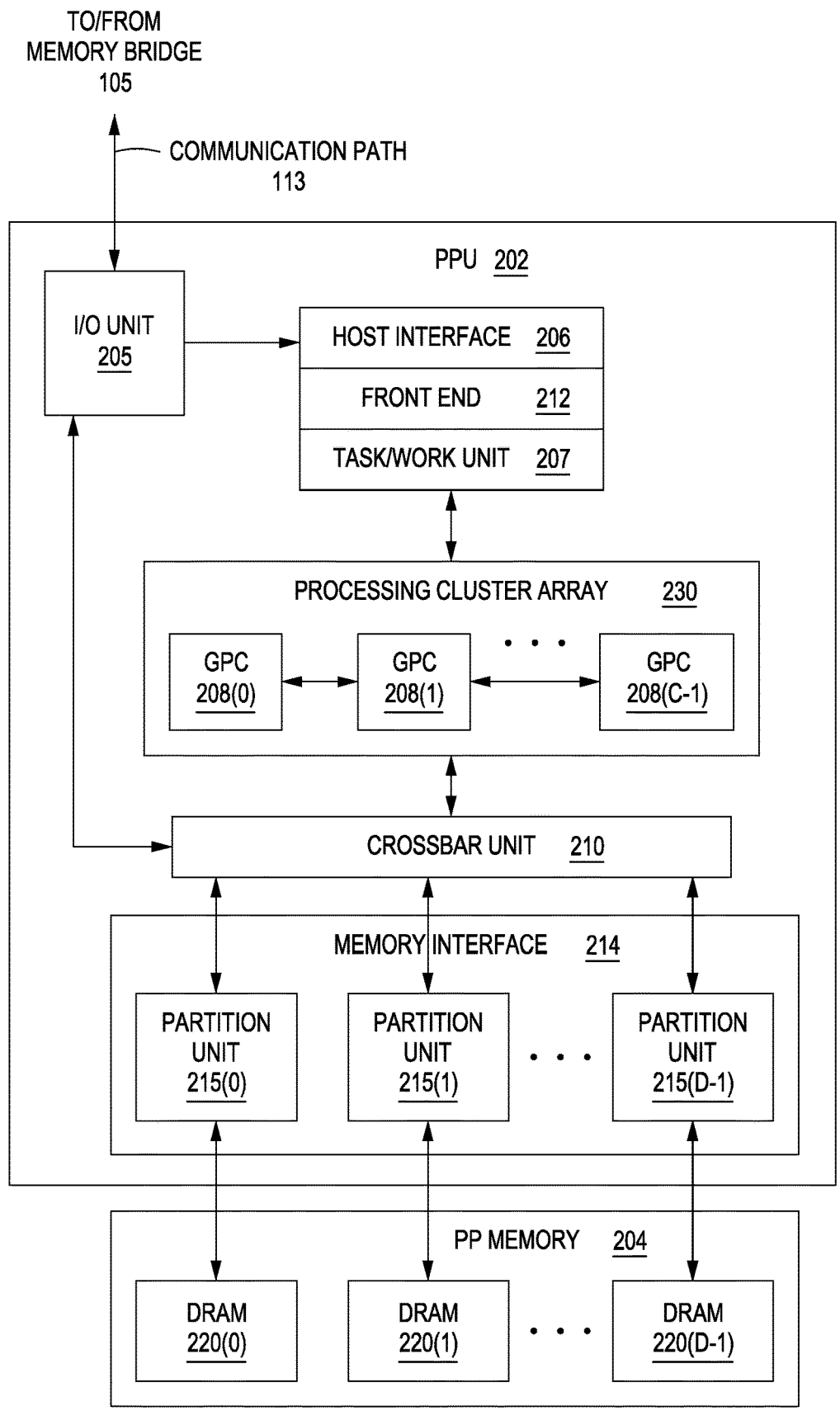
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
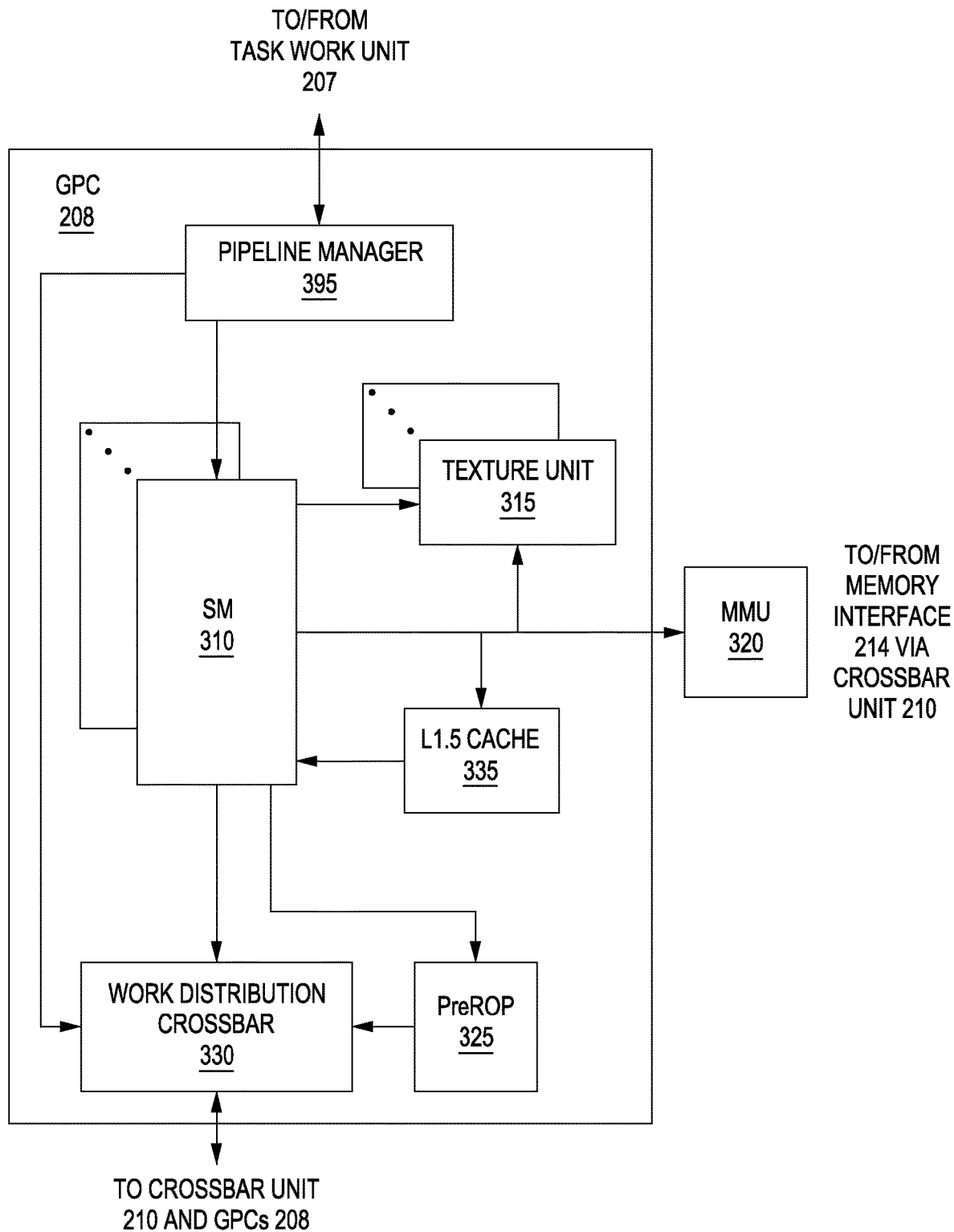
FIG. 3A is a block diagram of a general processing cluster included in the parallel processing unit of FIG. 2, according to various embodiments of the present invention.

FIG. 3A is a block diagram of a GPC 208 included in PPU 202 of FIG. 2, according to various embodiments of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Figure 3B:
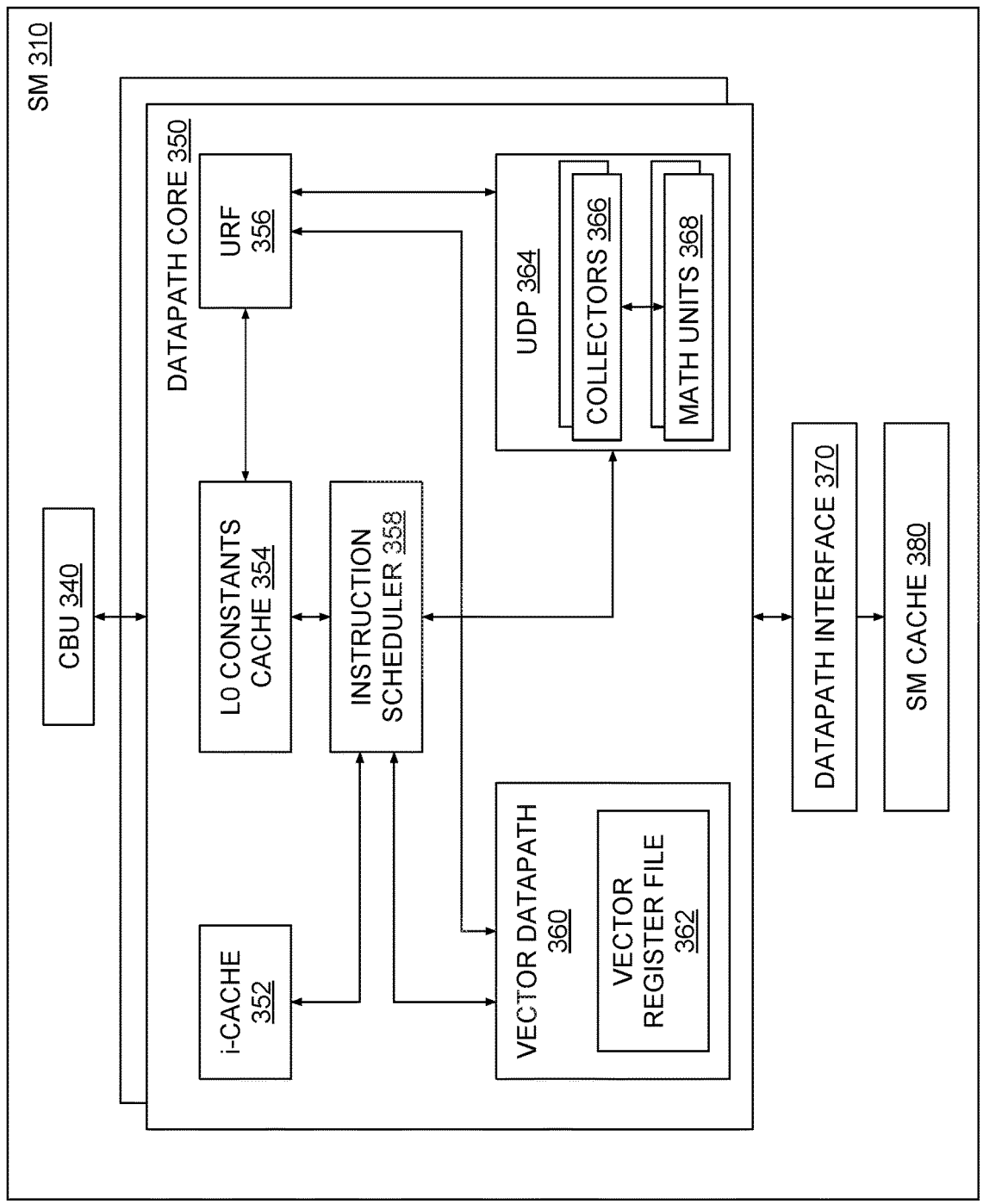
FIG. 3B is a more detailed illustration of the streaming multiprocessor of FIG. 3A, according to various embodiments of the present invention.

FIG. 3B is a more detailed illustration of the streaming multiprocessor (SM) of FIG. 3A, according to various embodiments of the present invention. As shown, SM 310 includes a convergence barrier unit (CBU) 340 coupled to one or more datapath cores 350. Each datapath core 350 is coupled downstream to a datapath interface 370 that, in turn, is coupled to an SM cache 380. SM cache 380 could be, for example, L1.5 cache 335 of FIG. 3A.

Each data path core 350 is configured to execute instructions associated with threads included in a thread group or warp. A given datapath core 350 includes an instruction cache (I-cache) 352, a level-zero (L0) constants cache 354, a uniform register file (URF) 356, an instruction scheduler 358, a vector datapath (VDP) 360 that includes a vector register file (VRF) 362, and a uniform datapath (UDP) 364 that includes collectors 366 and math units 368. Instruction cache 352 caches instructions to be executed by threads in one or more thread groups and/or instruction-oriented data. L0 constants cache 354 caches recently used constant values for expedited access. URF 356 is a shared memory resource configured to include uniform registers (URs) that can be accessed independently by threads within a given thread group. Instruction scheduler 358 schedules cached instructions for execution. Instruction scheduler 358 schedules cached instructions for execution. Instruction scheduler 358 may schedule each thread included in a thread group for execution independently of other threads in the thread group, thereby preserving a common programming paradigm where threads are considered independent entities.

VDP 360 includes various units involved with the execution of vector-oriented instructions. Those units may include execution units, load/store units, and so forth. Vector register file 362 is configured to store data processed by groups of threads executing within VDP 360. Instructions executed via VDP 360 may be divergent in nature. UDP 364 includes various units involved with the execution of uniform instructions, including collectors 366 and math units 368. Math units 368 may be referred to generally as "math operators," as well. In the context of this disclosure, "uniform" instructions refer to those instructions which generally follow an identical or similar control path and process the same or closely related data. Units within UDP 364 may access URF 366 during execution.

In operation, VDP 360 and UDP 364 operate in conjunction with one another to execute program instructions compiled via driver 103. Those program instructions may be parsed during compilation into "cohesive" blocks of instructions that do not include instructions which diverge or reconverge. Other program instructions that do include instructions which diverge or reconverge may delimit these cohesive blocks of instructions. VDP 360 may execute divergent/convergent instructions, while UDP 364 may execute cohesive blocks of instructions. Each cohesive block may be allocated a specific UR within URF 356. A group of threads configured to execute the cohesive block may access the allocated UR during execution. Further, each thread in the group of threads is afforded independent access to the UR.

In one embodiment, when UDP 364 executes a cohesive block, collectors 366 initially collect input data for that cohesive block from the associated UR. The data may also be cached local to URF 356, in some cases. Each collector 366 then provides the collected input data to math units 368. Math units 368 may then perform various processing operations with the input data on behalf of associated threads. Accordingly, when any given thread in the thread group executes instructions associated with the cohesive block, each such thread has independent access to the input data collected from the UR. This approach differs from conventional techniques because datapath core 350 only preserves a single copy of the input data within UR, as opposed to storing multiple copies (as required by conventional techniques). In a further embodiment, when each thread in the thread group depends on the same base address, that base address can be computed just once and then stored within a UR. Then, each collector 366 may collect this base address on behalf of threads in the thread group, thereby reducing processing cycles by avoiding redundant computations. The generation and execution of cohesive blocks using corresponding URs is described in greater detail below in conjunction with FIGS. 4-8B.

Uniform Register File for Efficient Execution of Cohesive Blocks

Figure 4:
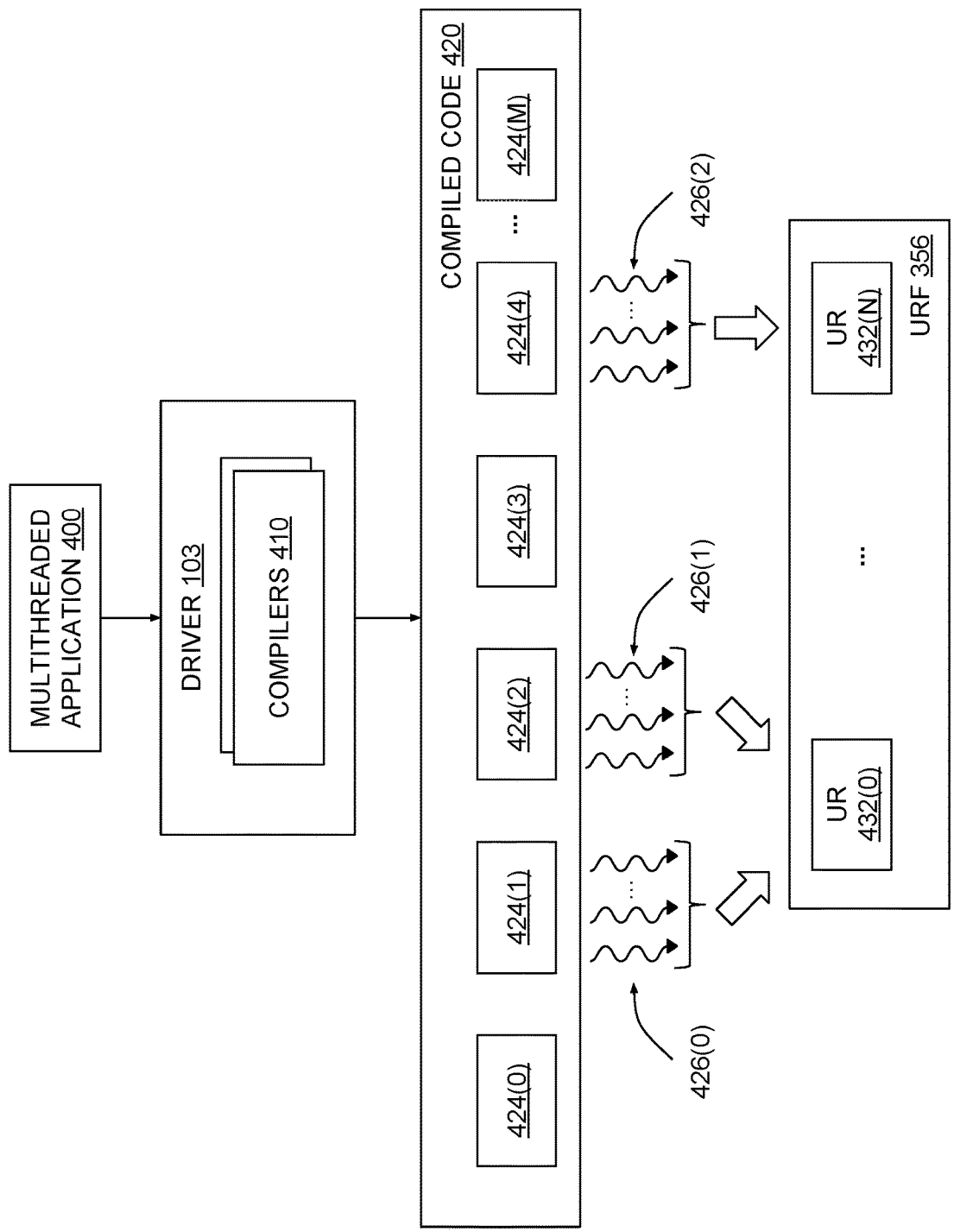
FIG. 4 is a conceptual illustration of how uniform registers are allocated to groups of threads prior to executing cohesive blocks, according to various embodiments of the present invention.

FIG. 4 is a conceptual illustration of how uniform registers are allocated to groups of threads prior to executing cohesive blocks, according to various embodiments of the present invention. As shown, driver 103 initially receives a multithreaded application 400 and then compiles that application, via one or more compilers 410, to generate compiled code 420. Multithreaded application 400 may be any technically feasible type of application, including a graphics-specific multithreaded application or a generic parallel processing application, among others. Compilers 410 may include a hierarchy of compilers where a given compiler in the hierarchy translates received instructions into intermediate instructions for further compilation by a subsequent compiler in the hierarchy. Compilers 410 may also include various hardware specific compilers that generate different types of machine code corresponding to specific underlying processor hardware. In one embodiment, a first compiler 410 compiles multithreaded application 400 to generate parallel thread execution (PTX) code, and then a second compiler 410 performs a just-in-time (JIT) compilation of the PTX code to generate machine specific compiled code 420 at runtime. In related embodiment, the second compiler 420 may instead generate machine executable binaries at compile time. In another embodiment, one or more additional compilers external to driver 103 may initially compile multithreaded application 400 and then transmit compiled code to driver 103 prior to the compilation steps described above. Persons skilled in the art will understand that many compilation paradigms can be applied without departing from the overall scope of the present disclosure.

During compilation, compilers 410 identify portions of multithreaded application 400 (or a compiled derivation thereof) that describe divergent or reconvergent program behavior and other portions that do not describe any divergent or reconvergent behavior. Compilers 410 then generate compiled code 420 to include cohesive blocks (CBs) 424. CBs 424 include instructions that will not converge, diverge, or reconverge upon execution. CBs 424 may be delimited by other instructions that cause convergent, divergent, or reconvergent program behavior.

Compilers 410 may implement many techniques to identify CBs 424. In one embodiment, compilers 410 initially designate all regions of multithreaded application 400 as including "uniform" instructions that potentially can be included in CBs 424. Then, compilers 410 iteratively apply different criteria to re-designate certain regions as including "non-uniform" instructions that cannot be included in CBs 424. Those re-designated regions delimit CBs 424. A given criterion could indicate, for example, that if two or more threads write different values during execution of a given subset of instructions, then that subset of instructions should be designated "non-uniform." Another criterion could indicate, for example, that any instructions included in a block that follows a synchronization instruction should be designated "non-uniform." Compilers 410 may implement any technically feasible set of criteria to identify non-uniform instructions, although generally these criteria serve to identify regions of instructions that converge, diverge, or reconverge.

SM 310 issues various groups of threads to execute CBs 424. For example, as is shown, thread groups 426(0), 426(1), and 426(2) are configured to execute instructions associated with CBs 424(1), 424(2), and 424(4), respectively. When a given CB 424 is executed, UDP 364 (or another entity within datapath core 330) allocates and initializes a corresponding UR 432 within URF 356. Each thread in the thread group executing the given CB 424 may access the corresponding UR 432 to obtain input data needed for executing the given CB 424. A given CB 424 could include, for example, a pointer to the corresponding UR 432. In the example shown, thread group 426(0) executes CB 424(1) with data stored in UR 432(0). Thread group 426(1) executes CB 424(2) with data stored in UR 432(0), as well. Thread group 426(2) executes CB 424(4) with data stored in UR 432(1). As a general matter, any one or more thread groups 426 may be dispatched to execute any one or more CBs 424 using any one or more URs 432.

Figure 5:
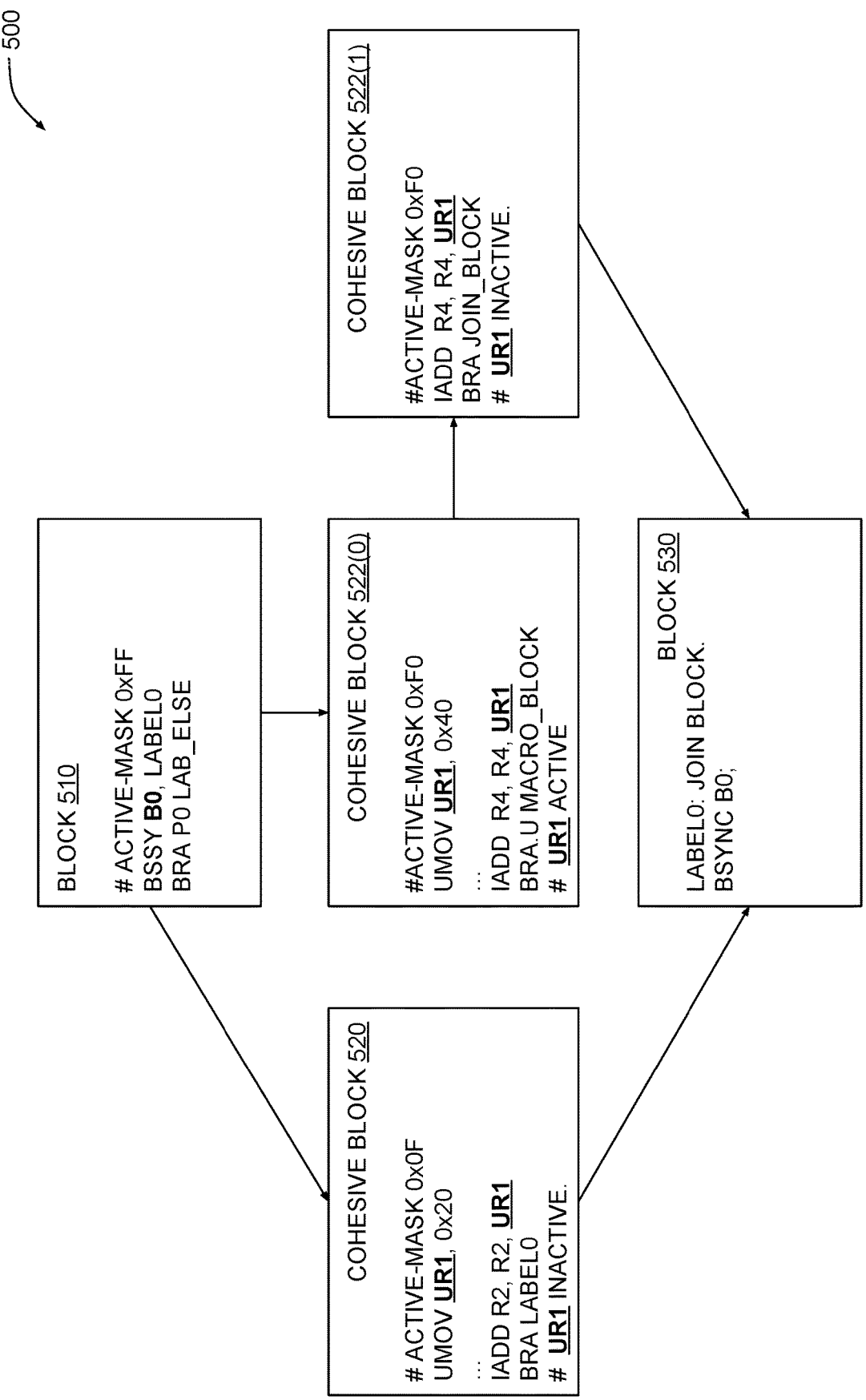
FIG. 5 is an illustration of exemplary cohesive blocks to be executed by a group of threads, according to various embodiments of the present invention.
Figure 6:
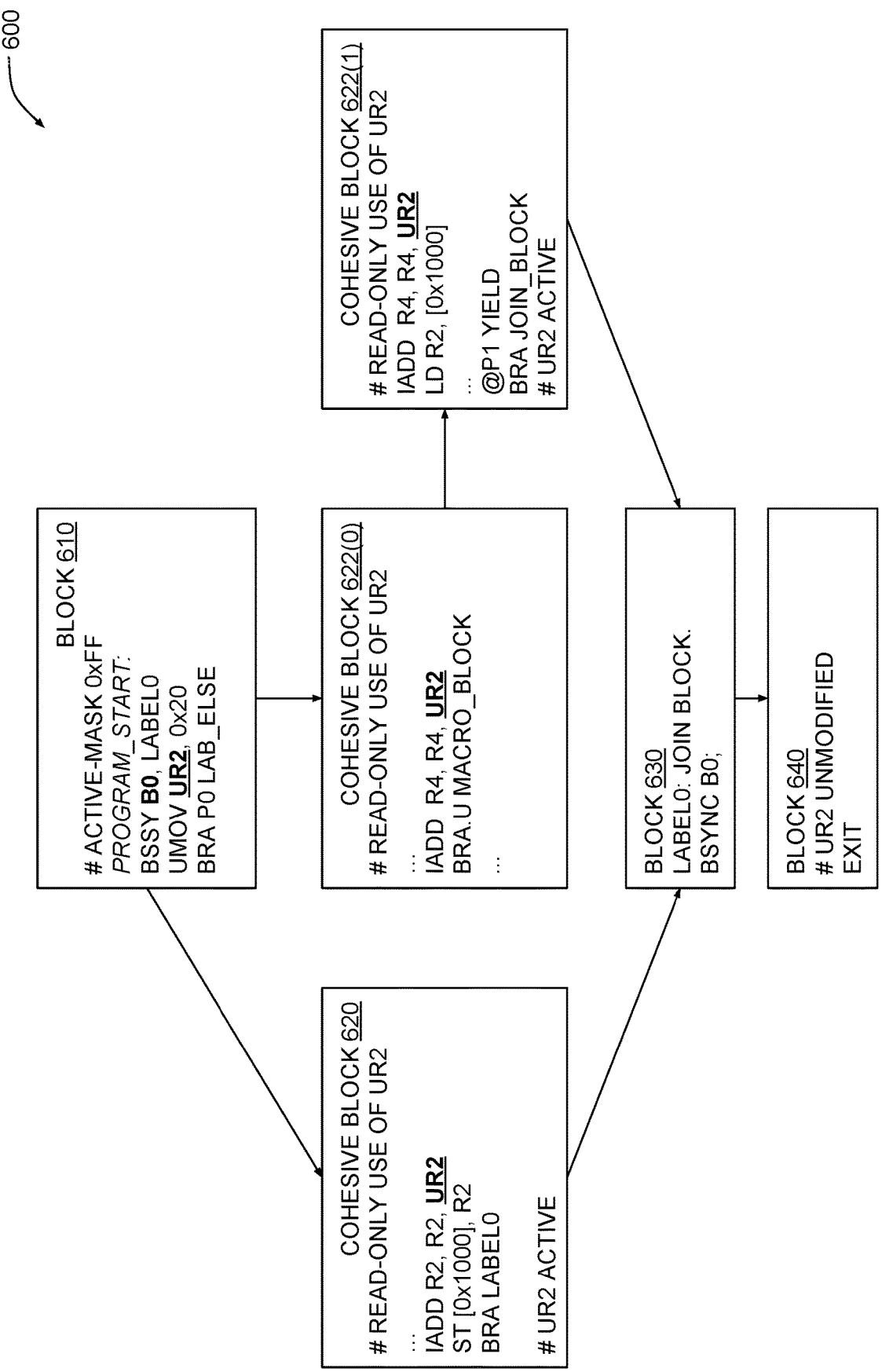
FIG. 6 is an illustration of exemplary cohesive blocks to be executed by a group of threads operating in read-only mode, according to various embodiments of the present invention.
Figure 7:
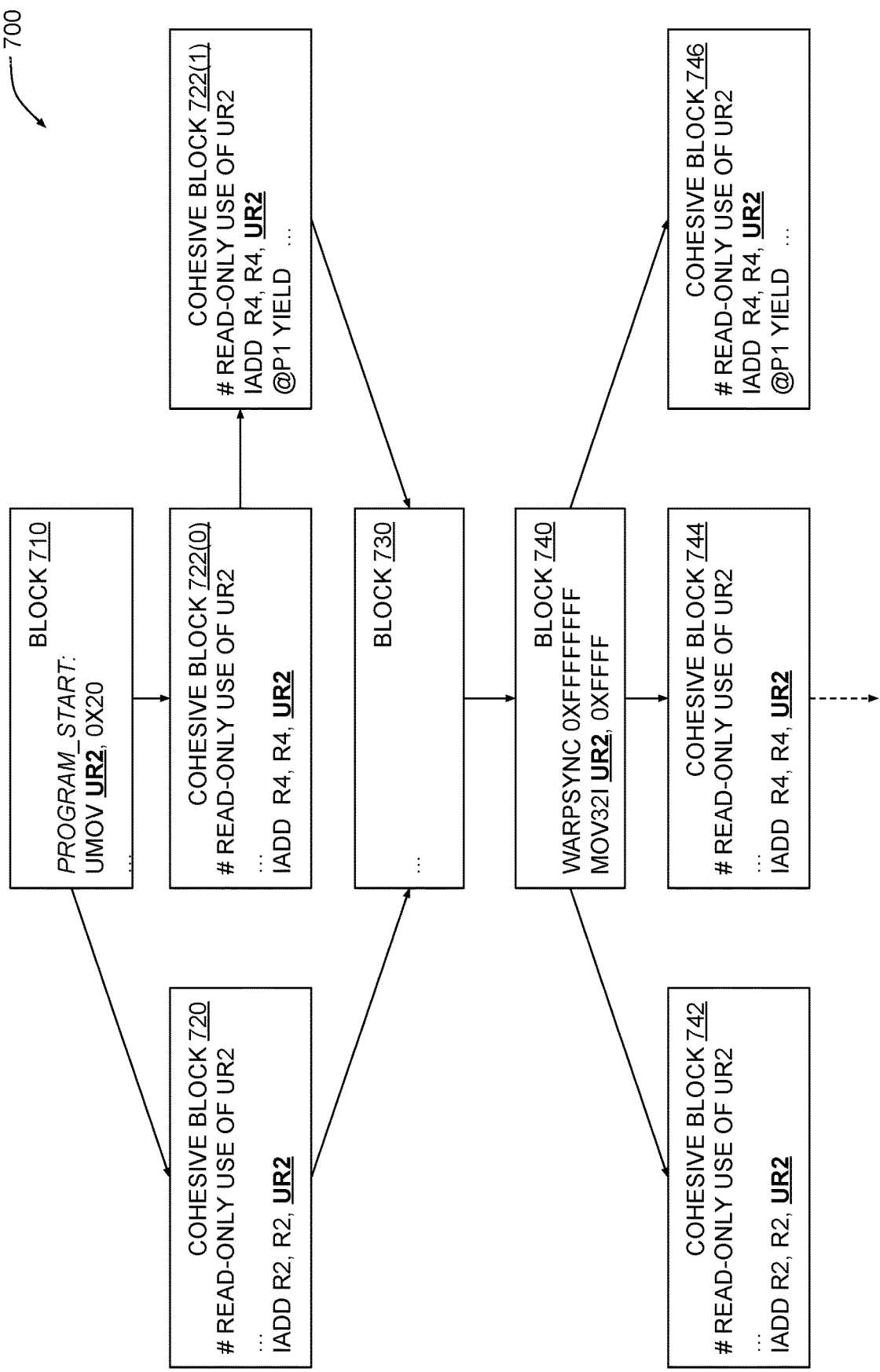
FIG. 7 is an illustration of exemplary cohesive blocks to be executed by a group of threads that are configured to synchronize with one another, according to various embodiments of the present invention.

As mentioned, each thread in a thread group 426 may access specific data stored within the corresponding UR 432 independently of other threads in the thread group. That specific data may include, among other things, a particular value or a particular array of values. Because each thread in a given thread group can independently access specific data in the manner described, allocating redundant copies of data is unnecessary to support the execution of CBs 424. Also, performing redundant operations separately for each thread, such as computing the same base address for all threads in the group, can be avoided. FIGS. 5-7 set forth exemplary sequences of program instructions parsed into cohesive blocks.

Exemplary Sequences of Cohesive Blocks

FIG. 5 is an illustration of exemplary cohesive blocks to be executed by a group of threads, according to various embodiments of the present invention. As shown, a program 500 includes a block 510, a cohesive block 520, sequential cohesive blocks 522, and block 530. As also shown, program flow proceeds from block 510 through cohesive block 520 to block 530. Program flow also proceeds from block 510, through cohesive blocks 522(0) and 522(1), to block 530. Blocks 510 and 530 may simply include individual instructions, in some cases.

One or more groups of threads may be configured to execute program 500 using computing resources included in datapath core 330. In addition, a group of threads having active mask 0x0F is configured to execute cohesive block 520, and a group of threads having active mask 0xF0 is configured to execute cohesive blocks 522(0) and 522(1). In one embodiment, instructions that do not change the active mask of a given thread group and also operate with the same program counter can be grouped together into a cohesive block. Generally, if the active mask of a thread group changes at a given boundary, then instructions on either side of that boundary are grouped into different blocks.

During execution of cohesive block 520, each thread in the associated thread group may independently access data stored in a uniform register UR1. When execution of cohesive block 520 is complete, UR1 is inactive and can be reinitialized to prepare for execution of cohesive blocks 522.

Cohesive blocks 522(0) and 522(1) may represent different branches within program 500. For example, cohesive block 522(0) could include instructions to be executed when a first condition is met, while cohesive block 522(1) could include instructions to be executed when a second condition is met. Generally, related cohesive blocks (such as 522(0) and 522(1)) can be produced so long as all threads in the thread group branch together. In other words, all threads execute cohesive block 522(0), or all threads execute cohesive block 522(1).

During execution of cohesive block 522(0) or 522(1), each thread in the associated thread group may also independently access data stored in the uniform register UR1. For example, each thread may read a given base address from UR1 in order to perform various computations. Only one copy of the base address is needed, as described. When execution of cohesive blocks 522 is complete, usage of UR1 is also complete and UR1 can be reallocated elsewhere. When the program flow reaches block 530, the BSYNC instruction causes CBU 320 to synchronize the thread group. The BSYNC instruction may not be permitted within a cohesive block because BSYNC implements reconvergent thread behavior. Another exemplary program is set forth in conjunction with FIG. 6.

FIG. 6 is an illustration of exemplary cohesive blocks to be executed by a group of threads operating in read-only mode, according to various embodiments of the present invention. As shown, program 600 includes a block 610, a cohesive block 620, sequential cohesive blocks 622, block 630, and block 640. As also shown, program flow proceeds from block 610 through cohesive block 620 to block 530. Program flow also proceeds from block 610, through cohesive blocks 622(0) and 622(1), to block 630. Program flow then proceeds from block 630 to block 640. A thread group having active mask 0xFF is configured to execute program 600.

During execution, the thread group executes block 600 to populate a uniform register UR2 with data. Then, the thread group executes cohesive block 610 in read-only mode to read data from UR2. When execution of cohesive block 620 is complete, UR2 remains active. The thread group then executes cohesive blocks 622(0) and 622(1) in read-only mode to read data from UR2. When complete, UR2 continues to remain active because UR2 is unmodified. When program flow reaches block 630, the group of threads synchronizes and then, when executing block 640, exits.

During execution of program 600, UR2 need not be emptied and/or reallocated following each cohesive block because those cohesive blocks only read data from UR2. Data is not written until program 600 converges at block 630. For this reason, this programming pattern may be referred to as a "convergent write" pattern. As with program 500 discussed above in conjunction with FIG. 5, each thread in the thread group that accesses UR2 may do so independently of other threads in the group. Accordingly, UR2 may be re-used by other thread groups executing other portions of programs. This approach may conserve storage and/or reduce processor cycles. In particular, redundant copies of data stored in UR2 are not needed. Likewise, duplicative processing operations are not needed because thread groups that need the results of such operations can share a single result value stored in UR2.

FIG. 7 is an illustration of exemplary cohesive blocks to be executed by a group of threads that are configured to synchronize with one another, according to various embodiments of the present invention. As shown, a program 700 includes a block 710, a cohesive block 720, sequential cohesive blocks 722, block 730, block 740, and cohesive blocks 742, 744, and 746. As also shown, program flow proceeds from block 710 through cohesive block 720 to block 730. Program flow also proceeds from block 710, through cohesive blocks 722(0) and 722(1), to block 630. Program flow then proceeds from block 730 to block 740. Finally, program flow splits and flows through cohesive blocks 742, 744, and 746.

One or more thread groups having specific active masks execute block 710 and cohesive blocks 720 and 722. The thread group(s) that execute cohesive blocks 720 and 722 have different active masks, similar to programs 500 and 600 discussed above. Also, like program 600, the thread group(s) execute cohesive blocks 720 and 722 with UR2 in a read-only manner and so UR2 need not be spilled or filled when those cohesive blocks are complete. When cohesive blocks 720 and 722 are complete, a thread group executes additional instructions included in block 730 and then performs a warp-level synchronization when executing block 740. In one embodiment, block 740 indicates a specific set of threads that must execute subsequent instructions. At this point in program 700, UR2 may be reinitialized. Once block 740 is complete, different thread groups are dispatched to execute cohesive blocks 742, 744, and 746. These thread groups have different active masks although each may access UR2. Program 700 generally confers similar advantages as programs 500 and 600 because the threads in each thread group have independent access to individual data values stored in uniform registers associated with cohesive blocks.

Referring generally to FIGS. 5-7, the different programs discussed in conjunction with these examples illustrate how cohesive blocks are executed alongside one another in order to efficiently execute a multithreaded application. Because threads configured to execute cohesive blocks may share a single copy of data stored in a uniform register, storage space may be advantageously conserved. An additional advantage of implementing uniform registers is that identical operations need not be performed multiple times to provide identical input data to different threads in a thread group. Instead, the operation need only be performed once and the result stored in a uniform register accessible by each thread in the thread group. This particular approach may advantageously reduce an address resolution computation from many tens of cycles down to less than ten cycles. The techniques discussed thus far are also described in stepwise fashion in conjunction with FIGS. 8A-8B.

Figure 8A:
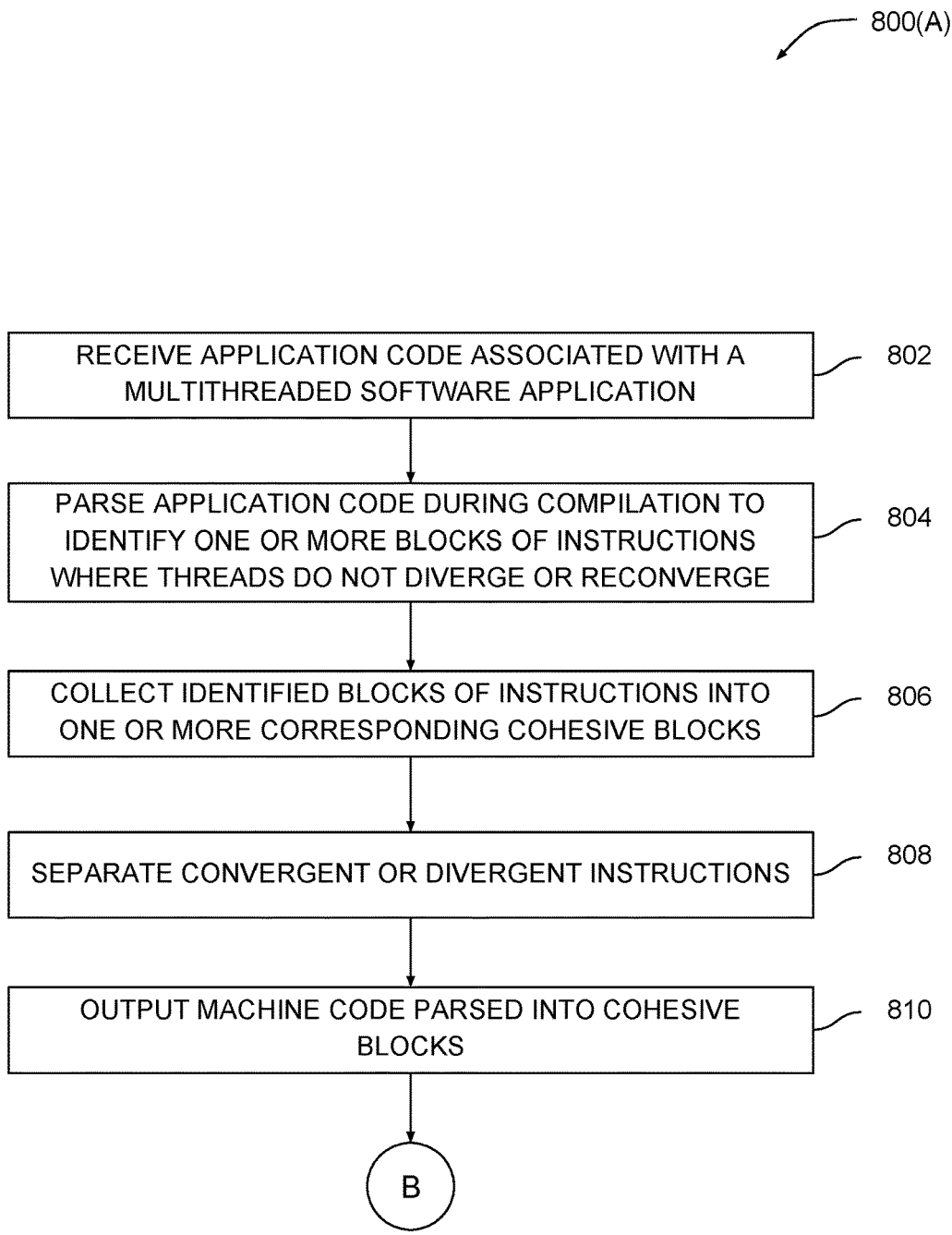
FIGS. 8A-8B set forth a flow diagram of method steps for executing cohesive blocks of machine code, according to various embodiments of the present invention.
Figure 8B:
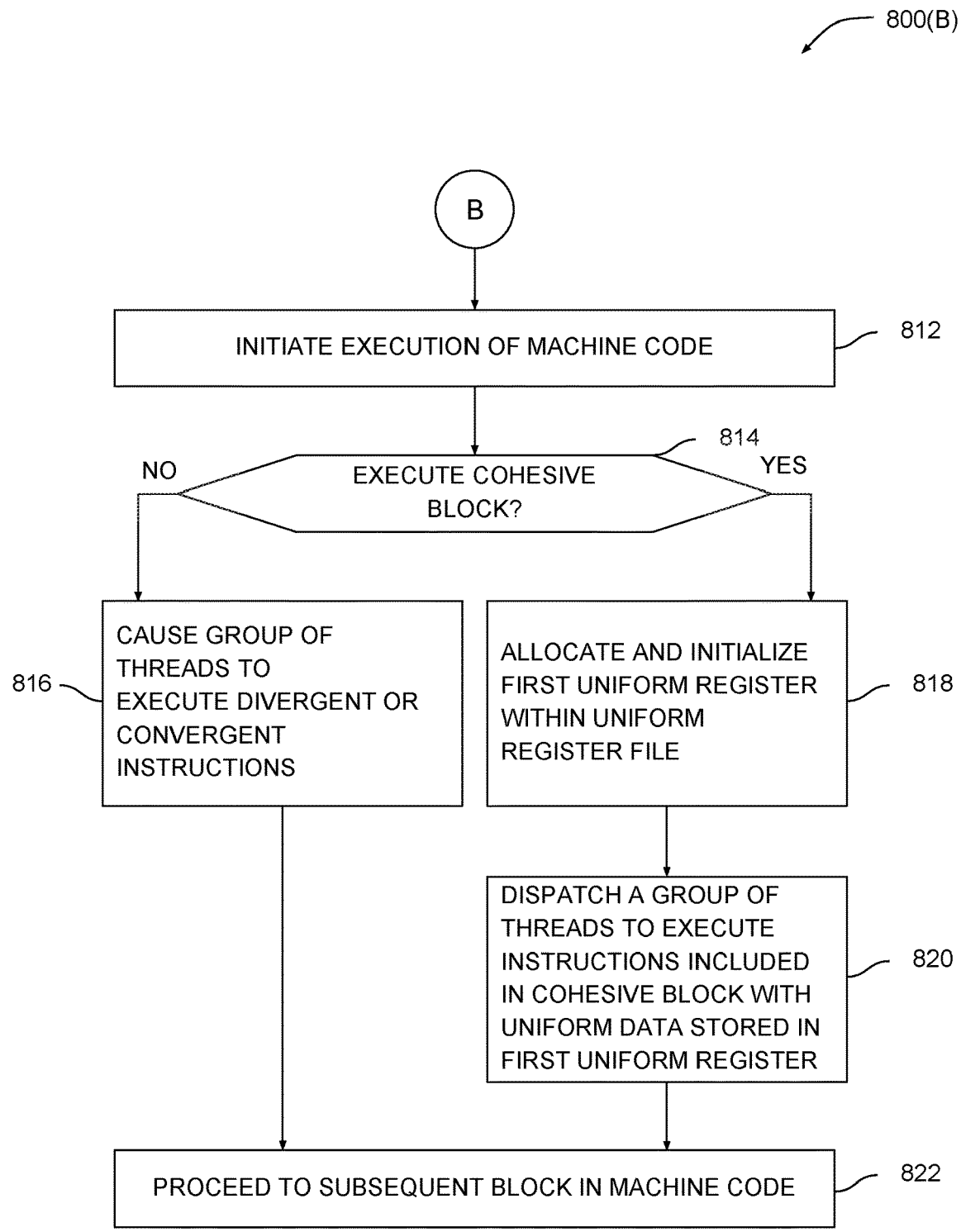

FIGS. 8A-8B set forth a flow diagram of method steps for executing cohesive blocks of machine code, according to various embodiments of the present invention. Although the method steps are described in conjunction with the system of FIGS. 1-7, persons skilled in the art will understand that any system configured to perform the method steps, in any order, falls within the scope of the present invention.

As shown in FIG. 8A, a method 800(A) begins at step 802, where device driver 103 of FIGS. 1 and 4 receives application code associated with a multithreaded software application, such as multithreaded application 400 shown in FIG. 4. At step 804, one or more compilers 410 within device driver 103 parses application code to identify one or more blocks of instructions where threads do not diverge or reconverge. Compiler(s) 410 may perform the parsing operation when compiling the multithreaded software application to an intermediate representation, when compiling the multithreaded application to machine code, and/or when performing just-in-time compilation associated with the multithreaded application. Persons skilled in the art will understand how divergent and reconvergent regions of instructions can be identified. At step 806, compiler(s) 410 collect the identified blocks of instructions into one or more corresponding cohesive blocks. At step 808, compiler(s) 410 separate out divergent and convergent instructions. These instructions may delimit the cohesive blocks identified at step 806. At step 810, compiler(s) output machine code parsed into cohesive blocks. The method 800(A) continues to the method 800(B) in FIG. 8B.

As shown in FIG. 8B, at step 812, device driver 103 initiates execution of machine code that includes cohesive blocks. Elements within a datapath core 350 generally execute some or all of the machine code when issued instruction by instruction scheduler 358. At step 816, instruction scheduler 358 determines whether to execute a cohesive block.

If at step 816 instruction scheduler 358 determines that a cohesive block is not to be executed, then the method proceeds to step 818. At step 818, instruction scheduler 358 issues the instruction, which may produce divergent or convergent behavior, to VDP 360. VDP 360 allocates resources for executing the instruction. The method then proceeds to step 822, where instruction scheduler 358 proceeds to a subsequent block of instructions.

If at step 816 instruction scheduler 358 determines that a cohesive block is to be executed, then the method proceeds to step 816, where UDP 364 allocates and initialize a first uniform register within uniform register file 356. At step 820, instruction scheduler 358 dispatches a group of threads to execute instructions included in the cohesive block with uniform data stored in the first uniform register. The method then proceeds to step 822, where instruction scheduler 358 proceeds to a subsequent block of instructions. The method then repeats as needed until program exit.

SM 310 in general, and datapath core 350 in particular, may implement specific steps of the method 800(B) repeatedly for any number of different blocks of instructions. Further, those blocks may be executed in parallel or serially.

In sum, a vector datapath includes a uniform register file (URF) that stores a single copy of data that is shared across all threads in a group of threads. The URF may also store a single copy of the result of an operation that each thread in the group of threads is configured to perform. When populating the URF, a compiler parses an application program to generate one or more "cohesive blocks" to be executed by one or more groups of threads. A cohesive block (CB) includes a subset of instructions that do not converge or diverge. A given CB also specifies a URF to store data to be used by a group of threads that executes the CB. When each thread in the group of threads performs an operation that depends on a given value, the URF stores a single copy of that value. Each thread is provided with independent access to the single copy of the value. Further, when each thread in the group of threads performs the same operation to generate a single result, the URF stores a single copy of that result. Each thread is provided with independent access to the single copy of the result.

One advantage of the approach described herein is that only one copy of input data needs to be stored on behalf of all threads in a group of threads. Accordingly, storage space and processor area can be conserved. The disclosed approach therefore represents a technical advancement over conventional techniques that require separate copies of the input data to be stored for each different thread. Another advantage of the disclosed approach is that multiple threads need not perform identical operations to generate identical results, thereby conserving processor cycles and increasing processor efficiency. Thus, the approach described herein confers a technical advantage by improving the operation of a computing device. In addition, because each thread is provided with independent access to the single copy of data stored in the URF, application programmers can write programs with granular control over individual threads without needing to consider higher level groupings of threads. Accordingly, programmers who are familiar with single-threaded architectures may comfortably apply programming paradigms associated with those architectures to multi-threaded architectures.

Any and all combinations of any of the claim elements recited in any of the claims and/or any elements described in this application, in any fashion, fall within the contemplated scope of the present embodiments and protection.

1. Some embodiments include a computer-implemented method for executing cohesive blocks of instructions, the method comprising: parsing an application program to generate a first cohesive block, wherein the first cohesive block comprises a first set of instructions that do not converge and do not diverge, causing a first thread in a first group of threads to access a first uniform register file to read a first value while executing the first cohesive block, and causing a second thread in the first group of threads to access the first uniform register to read the first value while executing the first cohesive block, wherein the second thread accesses the first value at least partially in parallel with the first thread accessing the first value.

2. The computer-implemented method of clause 1, further comprising: parsing the application program to generate a second cohesive block, wherein the second cohesive block comprises a second set of instructions that do not converge and do not diverge, and causing one or more threads in a second group of threads to access the first uniform register to read the first value while executing the second cohesive block.

3. The computer-implemented method of any of clauses 1 and 2, wherein the first group of threads is associated with a first active mask, and the second group of threads is associated with a second active mask that differs from the first active mask.

4. The computer-implemented method of any of clauses 1, 2, and 3, further comprising: parsing the application program to generate a first block, wherein the first block comprises a third set of instructions that converge, and causing at least one thread included in the first group of threads and at least one thread included in the second group of threads to synchronize with one another in response to the third set of instructions being executed.

5. The computer-implemented method of any of clauses 1, 2, 3, and 4, further comprising: parsing the application program to generate a first block, wherein the first block comprises a third set of instructions that diverge, and causing two or more other groups of threads to execute instructions included in two or more corresponding cohesive blocks in response to the third set of instructions being executed.

6. The computer-implemented method of any of clauses 1, 2, 3, 4, and 5, further comprising: parsing the application program to identify a first operation that is to be performed by each thread in the first group of threads and, when performed by a given thread, generates the first value, causing the first uniform register to store a single copy of the first value, wherein the first thread in the first group of threads extracts the first value from the first uniform register instead of performing the first operation and the second thread in the first group of threads extracts the first value from the first uniform register instead of performing the first operation.

7. The computer-implemented method of any of clauses 1, 2, 3, 4, 5, and 6, wherein causing the first uniform register to store a single copy of the first value comprises: causing a third thread in the first group of threads to perform the first operation to generate to first value, and causing the third thread to store the first value in the first uniform register.

8. The computer-implemented method of any of clauses 1, 2, 3, 4, 5, 6, and 7, further comprising: parsing the application program to generate a first block, wherein the first block comprises a second set of instructions that converge or diverge, and causing the first group of threads to execute the first block via a first datapath, wherein the first group of threads executes the first cohesive block via a second datapath.

9. The computer-implemented method of any of clauses 1, 2, 3, 4, 5, 6, 7, and 8, further comprising: causing a scheduler to schedule the first thread to execute the first cohesive block, and causing the scheduler to schedule the second thread to execute the first cohesive block, wherein the scheduler schedules the first thread independently of scheduling the second thread.

10. Some embodiments include a non-transitory computer-readable medium storing program instructions that, when executed by a processor, cause the processor to execute cohesive blocks of instructions by performing the steps of: parsing an application program to generate a first cohesive block, wherein the first cohesive block comprises a first set of instructions that do not converge and do not diverge, causing a first thread in a first group of threads to access a first uniform register to read a first value while executing the first cohesive block, and causing a second thread in the first group of threads to access the first uniform register to read the first value while executing the first cohesive block, wherein the second thread accesses the first value at least partially in parallel with the first thread accessing the first value.

11. The non-transitory computer-readable medium of clause 10, further comprising the steps of: parsing the application program to generate a second cohesive block, wherein the second cohesive block comprises a second set of instructions that do not converge and do not diverge, and causing one or more threads in a second group of threads to access the first uniform register to read the first value while executing the second cohesive block.

12. The non-transitory computer-readable medium of any of clauses 10 and 11, further comprising the steps of: parsing the application program to generate a first block, wherein the first block comprises a third set of instructions that converge, and causing at least one thread included in the first group of threads and at least one thread included in the second group of threads to synchronize with one another in response to the third set of instructions being executed.

13. The non-transitory computer-readable medium of any of clauses 10, 11, and 12, further comprising the steps of: parsing the application program to generate a first block, wherein the first block comprises a third set of instructions that diverge, and causing two or more other groups of threads to execute instructions included in two or more corresponding cohesive blocks in response to the third set of instructions being executed.

14. The non-transitory computer-readable medium of any of clauses 10, 11, 12, and 13, further comprising the steps of: parsing the application program to identify a first operation that is to be performed by each thread in the first group of threads and, when performed by a given thread, generates the first value, causing the first uniform register to store a single copy of the first value, wherein the first thread in the first group of threads extracts the first value from the first uniform register instead of performing the first operation and the second thread in the first group of threads extracts the first value from the first uniform register instead of performing the first operation, and wherein a third thread in the first group of threads performs the first operation to generate to first value and store the first value in the first uniform register.

15. The non-transitory computer-readable medium of any of clauses 10, 11, 12, 13, and 14, wherein the first group of threads executes the first cohesive block via a first datapath that includes the first uniform register.

16. The non-transitory computer-readable medium of any of clauses 10, 11, 12, 13, 14, and 15, further comprising the step of causing a third group of threads to execute a first block of instructions via a second datapath that includes a first vector register file, wherein the first block comprises a second set of instructions that converge or diverge.

17. The non-transitory computer-readable medium of any of clauses 10, 11, 12, 13, 14, 15, and 16, wherein the first cohesive block includes a first pointer to the first uniform register.

18. Some embodiments include a system for executing cohesive blocks of instructions, comprising: a memory storing a device driver, and a processor that, when executing the device driver, is configured to perform the steps of: parsing an application program to generate a first cohesive block, wherein the first cohesive block comprises a first set of instructions that do not converge and do not diverge, causing a first thread in a first group of threads to access a first uniform register to read a first value while executing the first cohesive block, and causing a second thread in the first group of threads to access the first uniform register to read the first value while executing the first cohesive block, wherein the second thread accesses the first value at least partially in parallel with the first thread accessing the first value.

19. The system of clause 18, further comprising: a datapath core, including: a vector datapath that executes instructions that diverge or converge, a uniform datapath that executes instructions that do not diverge and do not converge, and a uniform register file that is coupled to the vector datapath and to the uniform datapath and that includes the first uniform register.

20. The system of any of clauses 18 and 19, wherein the uniform datapath comprises: a plurality of collectors that read the first value from the first uniform register, and a plurality of math operators that perform one or more operations with the first value.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the various embodiments described herein may be implemented in any type of graphics operation that involves constant values, such as ray tracing. However, the various embodiments may be implemented more broadly in any graphics system or graphics environment, in any cloud computing environment, within one or more server machines for purposes of gaming, graphics, video streaming, etc., or in any Vehicle Navigation, Infotainment or instrument cluster controller system (e.g., as found in Automobiles). The NVIDIA GeForce NOW® is an example of a networked gaming service that can leverage the various embodiments to enhance performance and the overall user experience.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for executing cohesive blocks of instructions, the method comprising:
    parsing an application program to generate a first cohesive block, wherein the first cohesive block comprises a first set of instructions that do not converge and do not diverge, and the first cohesive block specifies a first uniform register in a first uniform register file that stores data for a first group of threads that executes the first cohesive block;
    causing a first thread in the first group of threads to access the first uniform register to read a first value while executing the first cohesive block; and
    causing a second thread in the first group of threads to access the first uniform register to read the first value while executing the first cohesive block, wherein the second thread accesses the first value at least partially in parallel with the first thread accessing the first value.

2. The computer-implemented method of claim 1, further comprising:
    parsing the application program to generate a second cohesive block, wherein the second cohesive block comprises a second set of instructions that do not converge and do not diverge; and
    causing one or more threads in a second group of threads to access the first uniform register to read the first value while executing the second cohesive block.

3. The computer-implemented method of claim 2, wherein the first group of threads is associated with a first active mask, and the second group of threads is associated with a second active mask that differs from the first active mask.

4. The computer-implemented method of claim 2, further comprising:
    parsing the application program to generate a first block, wherein the first block comprises a third set of instructions that converge; and
    causing at least one thread included in the first group of threads and at least one thread included in the second group of threads to synchronize with one another in response to the third set of instructions being executed.

5. The computer-implemented method of claim 2, further comprising:
    parsing the application program to generate a first block, wherein the first block comprises a third set of instructions that diverge; and causing two or more other groups of threads to execute instructions included in two or more corresponding cohesive blocks in response to the third set of instructions being executed.

6. The computer-implemented method of claim 1, further comprising:
parsing the application program to identify a first operation that is to be performed by each thread in the first group of threads and, when performed by a given thread, generates the first value;
causing the first uniform register to store a single copy of the first value, wherein the first thread in the first group of threads extracts the first value from the first uniform register instead of performing the first operation and the second thread in the first group of threads extracts the first value from the first uniform register instead of performing the first operation.

7. The computer-implemented method of claim 6, wherein causing the first uniform register to store a single copy of the first value comprises:
causing a third thread in the first group of threads to perform the first operation to generate to first value; and
causing the third thread to store the first value in the first uniform register.

8. The computer-implemented method of claim 1, further comprising:
parsing the application program to generate a first block, wherein the first block comprises a second set of instructions that converge or diverge; and
causing the first group of threads to execute the first block via a first datapath,
wherein the first group of threads executes the first cohesive block via a second datapath.

9. The computer-implemented method of claim 1, further comprising:
causing a scheduler to schedule the first thread to execute the first cohesive block; and
causing the scheduler to schedule the second thread to execute the first cohesive block, wherein the scheduler schedules the first thread independently of scheduling the second thread.

10. A non-transitory computer-readable medium storing program instructions that, when executed by a processor, cause the processor to execute cohesive blocks of instructions by performing the steps of:
parsing an application program to generate a first cohesive block, wherein the first cohesive block comprises a first set of instructions that do not converge and do not diverge, and the first cohesive block specifies a first uniform register in a first uniform register file that stores data for a first group of threads that executes the first cohesive block;
causing a first thread in the first group of threads to access the first uniform register to read a first value while executing the first cohesive block; and
causing a second thread in the first group of threads to access the first uniform register to read the first value while executing the first cohesive block, wherein the second thread accesses the first value at least partially in parallel with the first thread accessing the first value.

11. The non-transitory computer-readable medium of claim 10, further comprising the steps of:
parsing the application program to generate a second cohesive block, wherein the second cohesive block comprises a second set of instructions that do not converge and do not diverge; and
causing one or more threads in a second group of threads to access the first uniform register to read the first value while executing the second cohesive block.

12. The non-transitory computer-readable medium of claim 11, further comprising the steps of:
parsing the application program to generate a first block, wherein the first block comprises a third set of instructions that converge; and
causing at least one thread included in the first group of threads and at least one thread included in the second group of threads to synchronize with one another in response to the third set of instructions being executed.

13. The non-transitory computer-readable medium of claim 11, further comprising the steps of:
parsing the application program to generate a first block, wherein the first block comprises a third set of instructions that diverge; and
causing two or more other groups of threads to execute instructions included in two or more corresponding cohesive blocks in response to the third set of instructions being executed.

14. The non-transitory computer-readable medium of claim 10, further comprising the steps of:
parsing the application program to identify a first operation that is to be performed by each thread in the first group of threads and, when performed by a given thread, generates the first value;
causing the first uniform register to store a single copy of the first value, wherein the first thread in the first group of threads extracts the first value from the first uniform register instead of performing the first operation and the second thread in the first group of threads extracts the first value from the first uniform register instead of performing the first operation, and wherein a third thread in the first group of threads performs the first operation to generate to first value and store the first value in the first uniform register.

15. The non-transitory computer-readable medium of claim 10, wherein the first group of threads executes the first cohesive block via a first datapath that includes the first uniform register.

16. The non-transitory computer-readable medium of claim 15, further comprising the step of causing a third group of threads to execute a first block of instructions via a second datapath that includes a first vector register file, wherein the first block comprises a second set of instructions that converge or diverge.

17. The non-transitory computer-readable medium of claim 10, wherein the first cohesive block includes a first pointer to the first uniform register.

18. A system for executing cohesive blocks of instructions, comprising:
a memory storing a device driver; and
a processor that, when executing the device driver, is configured to perform the steps of:
parsing an application program to generate a first cohesive block, wherein the first cohesive block comprises a first set of instructions that do not converge and do not diverge, and the first cohesive block specifies a first uniform register in a first uniform register file that stores data for a first group of threads that executes the first cohesive block,
causing a first thread in the first group of threads to access the first uniform register to read a first value while executing the first cohesive block, and
causing a second thread in the first group of threads to access the first uniform register to read the first value while executing the first cohesive block, wherein the second thread accesses the first value at least partially in parallel with the first thread accessing the first value.

19. The system of claim 18, further comprising:
a datapath core, including:
   a vector datapath that executes instructions that diverge or converge,
   a uniform datapath that executes instructions that do not diverge and do not converge, and
   the first uniform register file that is coupled to the vector datapath and to the uniform datapath and that includes the first uniform register.

20. The system of claim 19, wherein the uniform datapath comprises:
   a plurality of collectors that read the first value from the first uniform register; and
   a plurality of math operators that perform one or more operations with the first value.

* * * * *